(12) United States Patent
Campbell et al.

(10) Patent No.: US 10,530,978 B2
(45) Date of Patent: Jan. 7, 2020

(54) INTEGRATED IMAGE SENSOR AND LENS ASSEMBLY

(71) Applicant: GoPro, Inc., San Mateo, CA (US)

(72) Inventors: Scott Patrick Campbell, Belmont, CA (US); Thomas Czepowicz, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/144,140

(22) Filed: Sep. 27, 2018

(65) Prior Publication Data

US 2019/0028625 A1     Jan. 24, 2019

Related U.S. Application Data

(63) Continuation of application No. 14/705,891, filed on May 6, 2015, now Pat. No. 10,122,902.

(60) Provisional application No. 62/019,146, filed on Jun. 30, 2014, provisional application No. 61/990,053, filed on May 7, 2014.

(51) Int. Cl.
*H04N 5/225*  (2006.01)
*G03B 17/12*  (2006.01)
*G03B 43/00*  (2006.01)

(52) U.S. Cl.
CPC .......... *H04N 5/2257* (2013.01); *G03B 17/12* (2013.01); *G03B 43/00* (2013.01); *H04N 5/2252* (2013.01); *H04N 5/2253* (2013.01); *H04N 5/2254* (2013.01)

(58) Field of Classification Search
CPC .. H04N 5/2257; H04N 5/2252; H04N 5/2254; H04N 5/2253; G03B 43/00; G03B 17/12
See application file for complete search history.

(56) References Cited

U.S. PATENT DOCUMENTS

| 7,773,876 B2 * | 8/2010 | Westerweck ........... G03B 17/02 396/535 |
| 2007/0176086 A1 * | 8/2007 | Hiltunen ............. H04M 1/0264 250/239 |
| 2008/0105819 A1 * | 5/2008 | Wu .................... H01L 27/14618 250/216 |
| 2011/0293264 A1 * | 12/2011 | Sato ........................ G03B 3/10 396/529 |

(Continued)

FOREIGN PATENT DOCUMENTS

| JP | 2009075270 A | 4/2009 |
| JP | 2009186756 A | 8/2009 |

OTHER PUBLICATIONS

English Translation KR 10-2011-0125599 (Year: 2011).*

(Continued)

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

An integrated image sensor and lens assembly comprises an image sensor substrate, an image sensor assembly mounted on the image sensor substrate and housing an image sensor, the image sensor assembly having one or more side walls, a lens barrel including one or more lenses, and an adhesive formed between a region of the lens barrel and the one or more side walls, the region being directly adhered to the one or more side walls via the adhesive.

20 Claims, 8 Drawing Sheets

(56) References Cited

U.S. PATENT DOCUMENTS

| | | | | |
|---|---|---|---|---|
| 2012/0019940 A1* | 1/2012 | Lu | ......................... | G02B 7/025 |
| | | | | 359/819 |
| 2012/0141114 A1* | 6/2012 | Gooi | ..................... | G03B 17/12 |
| | | | | 396/529 |
| 2013/0155311 A1* | 6/2013 | Grandin | ............... | H04N 5/2257 |
| | | | | 348/335 |
| 2013/0240714 A1* | 9/2013 | Higashitsutsumi | .... | G02B 5/201 |
| | | | | 250/208.1 |
| 2014/0307099 A1* | 10/2014 | Yeon | ................... | H04N 5/2257 |
| | | | | 348/164 |
| 2016/0012610 A1* | 1/2016 | Clemente | ............ | A61B 5/6898 |
| | | | | 600/315 |

OTHER PUBLICATIONS

PCT International Search Report and Written Opinion, PCT Application No. PCT/US15/29547, dated Aug. 7, 2015, eleven pages.

* cited by examiner

INTEGRATED IMAGE SENSOR AND LENS ASSEMBLY

CROSS-REFERENCE TO RELATED APPLICATION(S)

This application is a continuation of U.S. patent application Ser. No. 14/705,891, filed on May 6, 2015, which claims the benefit of U.S. Provisional Patent Application Ser. No. 61/990,053, filed May 7, 2014 and U.S. Provisional Patent Application Ser. No. 62/019,146, filed Jun. 30, 2014. The subject matter of the foregoing is incorporated herein by reference in its entirety.

BACKGROUND

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In a conventional manufacturing process, a lens barrel housing the camera lens is placed within a housing assembly affixed to an image sensor. Upon testing the lens barrel to position it for proper alignment, the lens barrel is affixed to the housing assembly using a "floating" assembly process whereby the lens barrel is attached to the housing using adhesive between a ridge of the lens barrel extending parallel to the image plane and an inner lip of the housing extending parallel to the image plane. The adhesive may expand and/or contract when cured, or after curing, the adhesive may expand and/or contract over time based on changes in temperature or other conditions. Because the adhesive is placed between surfaces of the lens barrel and housing that are parallel to the image plane, the expansion or contraction of the adhesive causes the lens to shift along the optical axis, thus altering the distance between the lens and the image sensor. This affects focus of the lenses and compromises performance and yield.

DETAILED DESCRIPTION OF THE DRAWINGS

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an embodiment, an integrated image sensor and lens assembly comprises a lens barrel adhered to a lens holder using an adhesive ring applied between an exterior surface of the lens barrel and an interior surface of the lens holder that are oriented in a direction perpendicular to the image plane (parallel to the optical axis). The lens barrel and lens holder are bonded based on the sheer strength (rather than the tensile strength) of the adhesive. Thus, adhesive expansion does not substantially affect the distance between the lens and the image sensor and therefore does not affect the focal plane of the assembly. As described herein, substantially constant refers to the optical distance is within a predefined tolerance that would be acceptable to those skilled in art. In various embodiments, the predefined tolerance can be, for example, a 1% tolerance, a 2% tolerance, a 5% tolerance, etc. While expansion or contraction of the adhesive may still occur, the forces are directed radially (rather than axially) and are counteracted because the adhesive is applied concentrically.

In another embodiment, an integrated image sensor and lens assembly comprises a lens barrel adhered to an image sensor assembly using an adhesive applied between a surface of the lens barrel and an outer side wall of the image sensor assembly that are oriented in a direction perpendicular to the image plane (parallel to the optical axis). The lens barrel and image sensor assembly are bonded based on the sheer strength (rather than the tensile strength) of the adhesive. Thus, adhesive expansion does not substantially affect the distance between the lens and the image sensor and therefore does not affect the focal plane of the assembly. While expansion or contraction of the adhesive may still occur, the forces are directed radially (rather than axially) and are counteracted because the adhesive is applied concentrically.

Figure 1:
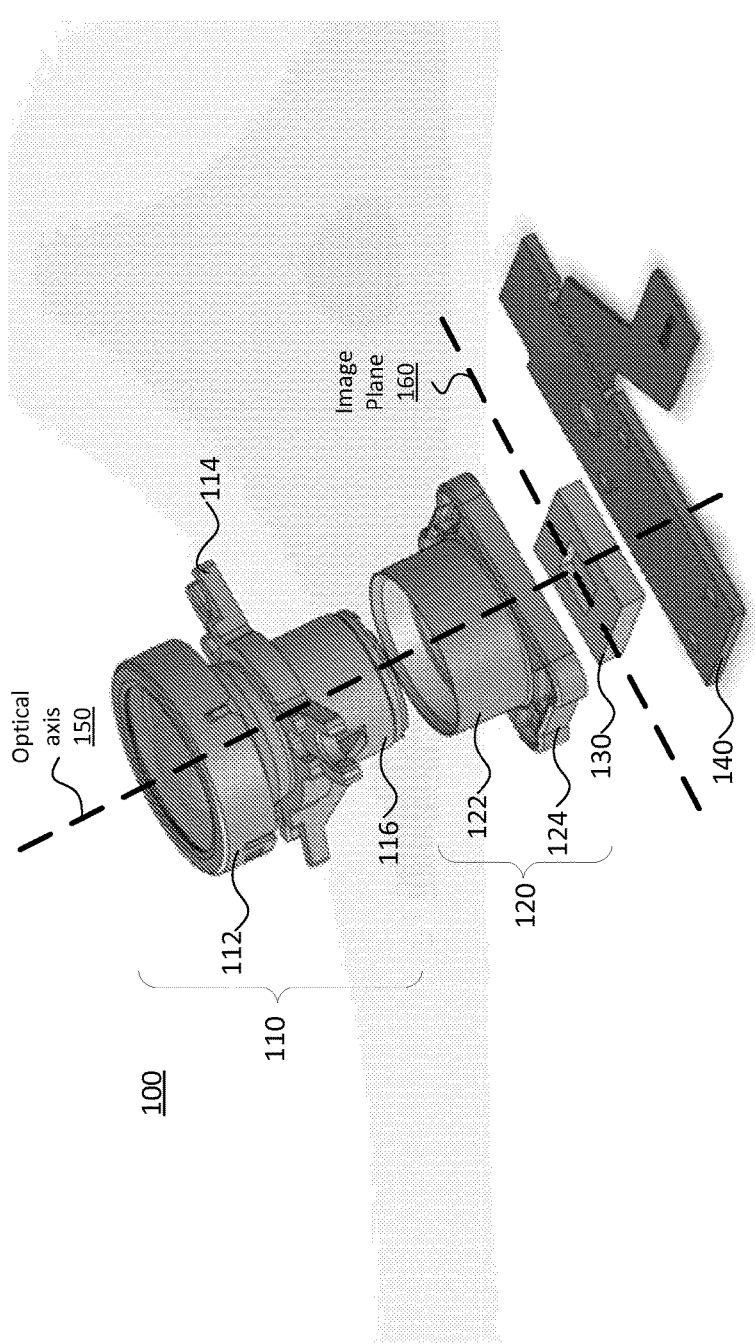
FIG. 1 illustrates an exploded view of an example integrated image sensor and lens assembly, according to one embodiment.

FIG. 1 illustrates an exploded view of an embodiment of an integrated image sensor and lens assembly 100. The integrated image sensor and lens assembly 100 comprises an image sensor substrate 140, an image sensor assembly 130, a lens holder 120, and a lens barrel 110. The image sensor substrate 140 comprises a printed circuit board for mounting the image sensor assembly 130 and may furthermore include various electronic components that that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to the lens holder 120. The image sensor of the image sensor assembly 130 lies on an image plane 160. The lens holder 120 physically couples with the image sensor assembly 130 and the lens barrel 110. In one embodiment, the lens holder 120 comprises a base portion 124 and a tube portion 122. The base portion 124 includes a bottom surface in a plane substantially parallel to a surface of the image sensor substrate 140. Furthermore, the base portion 124 includes a recess (not viewable in FIG. 1) to enable the bottom surface of the base portion 124 to lie flat against the image sensor substrate 140 while partially enclosing the image sensor assembly 130. The tube portion 122 of the lens holder 120 extends away from the image sensor assembly 130 along the optical axis 150 and includes a substantially cylindrical channel for receiving the lens barrel 110. The lens barrel 110 comprises one or more lenses or other optical components to direct light to the image sensor assembly 130. The lens barrel 110 comprises a lower portion 116, one or more barrel arms 114, and a lens window 112. The lower portion of the lens barrel 116 is substantially cylindrical and structured to at least partially extend into the channel of the tube portion 122 of the lens holder 120. The lens arms 114 extend radially from the body of the lens barrel 110 and are outside the channel of the lens holder 120 when assembled. The lens arms 114 may be used to physically couple the lens barrel 110 to the camera body (not shown). The lens window 112 includes optical components to enable external light to enter the lens barrel 110 and be directed to the image sensor assembly 130.

Figure 2:
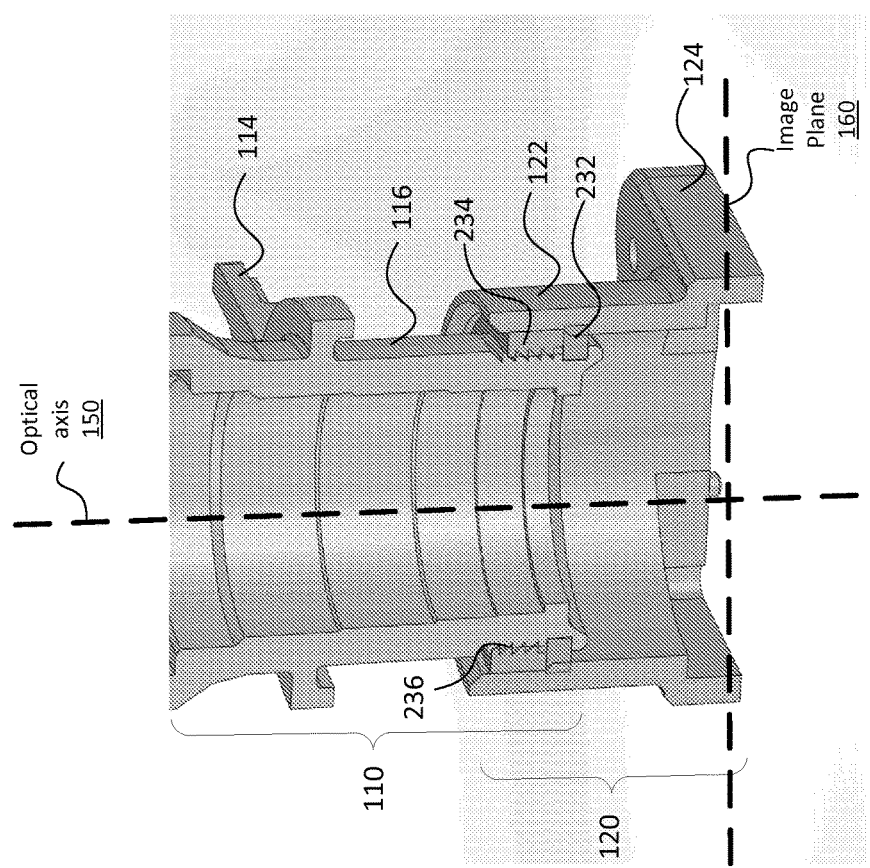
FIG. 2 illustrates a cross-sectional view of the lens holder and lens barrel sliced along a plane parallel to the optical axis, according to one embodiment.

FIG. 2 illustrates a cross-sectional view of the lens holder 120 and lens barrel 110 sliced along a plane parallel to the optical axis 150. Interior components (e.g., lenses) of the lens barrel 110 are omitted to more clearly show the structural features of the lens barrel 110. As illustrated in FIG. 2, the lower portion 116 of the lens barrel 110 partially extends into the tube portion 122 of the lens holder 120. An adhesive 234 is applied between an interior surface of the tube portion 122 that is oriented parallel to the optical axis 150 and an exterior surface of the lower portion 116 of the lens barrel 110 (also oriented parallel to the optical axis 150) to radially bond the lens barrel 110 to the lens holder 120. The section of the lower portion 16 of the lens barrel 110 that extends into the tube portion 122 of the lens holder 120 is adhered to the tube portion 122 via the adhesive 234. The lens barrel 110 and lens holder 120 are bonded based on the sheer strength of the adhesive 234. If expansion of the adhesive 234 occurs, the forces will be directed radially (i.e., along a plane parallel to the image plane) and will therefore not substantially affect the distance between the lens of the lens barrel 110 and the image plane 160.

In the illustrated embodiment, the lower portion 16 of the lens barrel 110 includes a plurality of ridges 236 on the exterior surface. The ridges 236 increase the surface area on the exterior surface of the lower portion 116 for the adhesive 234 to bond to and thereby increase the adhesive strength.

The illustrated embodiment also shows a gasket 232 positioned at a lower end of the lens barrel 110 just below the adhesive 234. The gasket 232 may be used in the manufacturing process as a barrier to prevent the adhesive 234 from overflowing and potentially reaching the image sensor if the adhesive 234 is insufficiently viscous. In one embodiment, the gasket 232 comprises a pliable material (e.g., rubber, plastic, etc.) so that it does not prevent fine adjustments from being made to the positioning of the lens barrel 110 relative to the image sensor assembly 130 along the optical axis during the assembly and alignment process. The pliability of the gasket 232 furthermore absorbs any forces along the optical axis caused by expansion or contraction of the adhesive 234.

Figure 3:
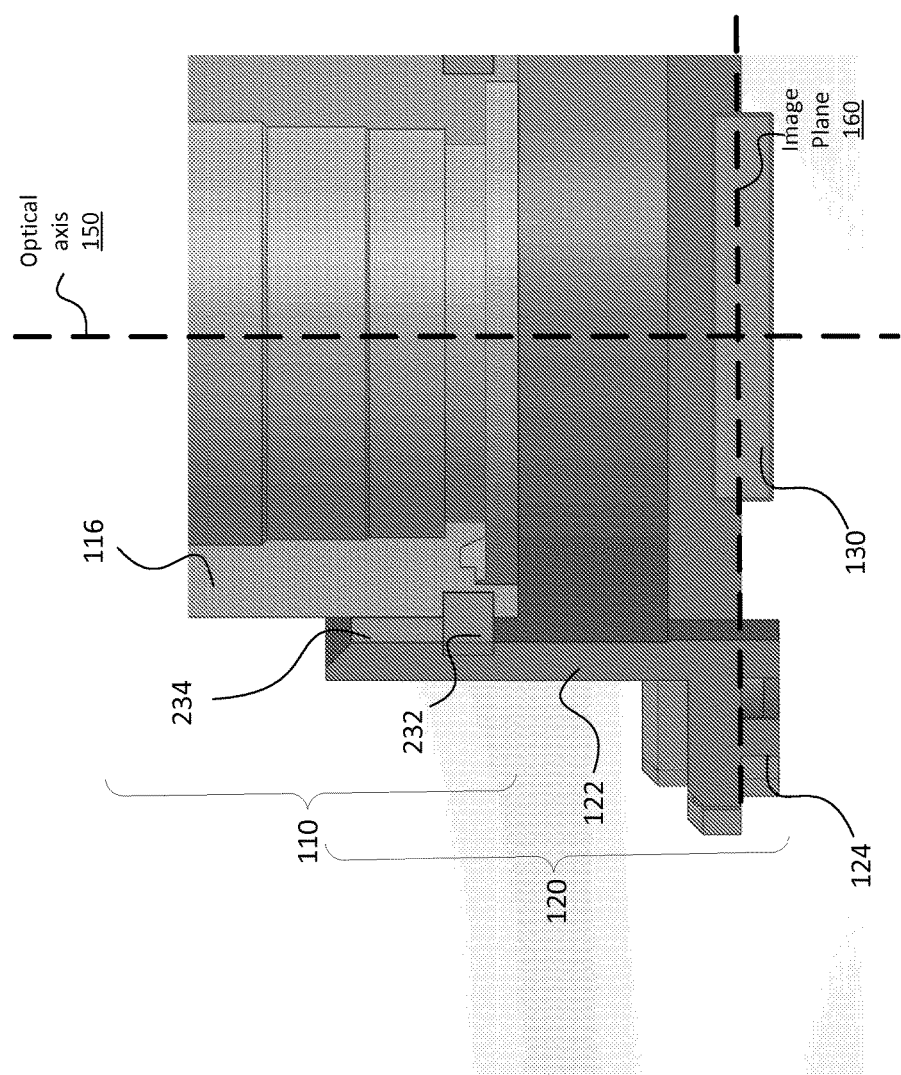
FIG. 3 illustrates a cross-sectional view of the lens holder and lens barrel sliced along a plane parallel to the optical axis, according to one embodiment.

FIG. 3 illustrates a cross-sectional view of the lens holder 120 and lens barrel 110 sliced along a plane parallel to the optical axis 150. In the illustrated example, the interior surface of the lens barrel 110 is substantially smooth and the adhesive 234 is applied to the interior surface of the lens barrel 110.

Figure 4:
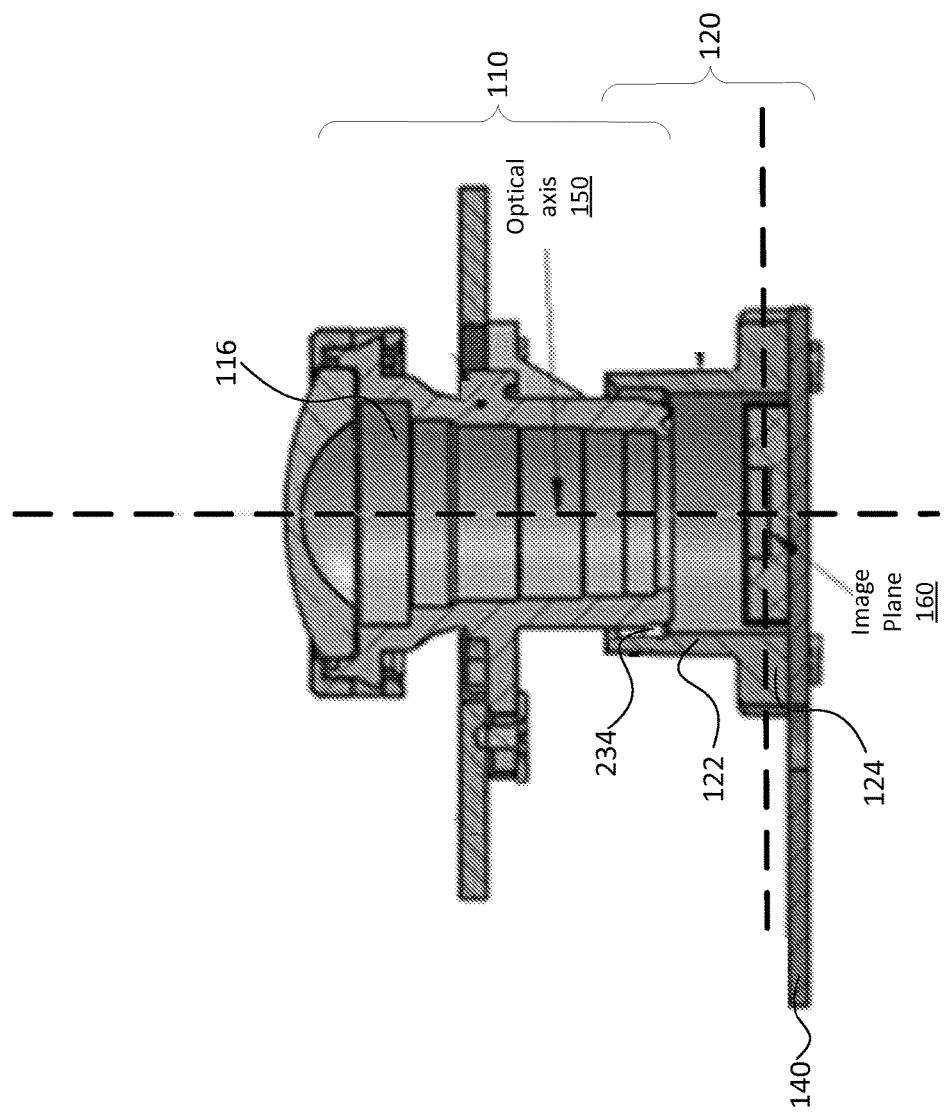
FIG. 4 illustrates a cross-sectional view of the lens holder and lens barrel sliced along a plane parallel to the optical axis, according to one embodiment.

FIG. 4 illustrates a cross-sectional view of the lens holder 120 and lens barrel 110 sliced along a plane parallel to the optical axis 150. The gasket 232 is omitted in this illustrated embodiment.

Figure 5:
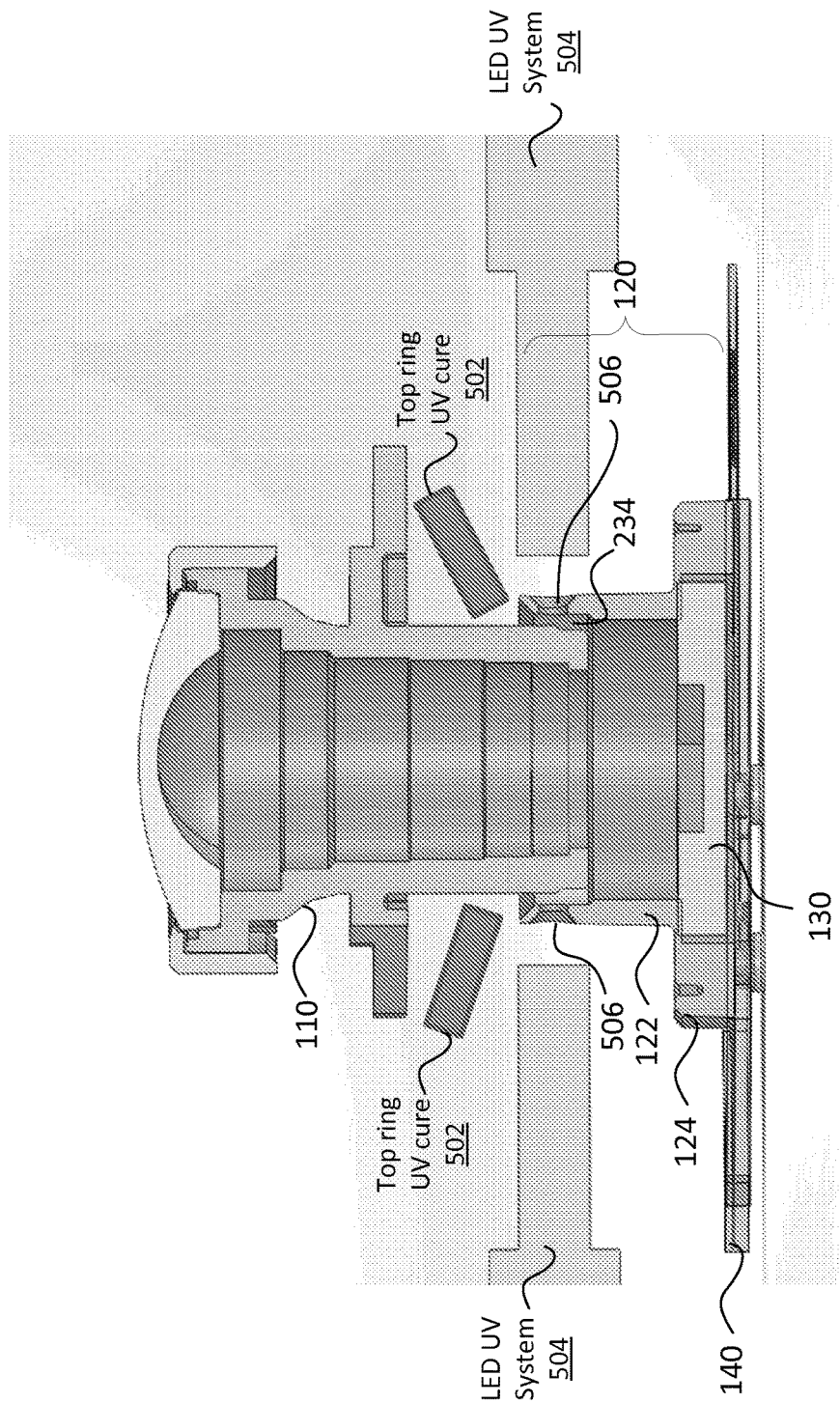
FIG. 5 illustrates an example integrated sensor and lens assembly undergoing a curing process during manufacture, according to an embodiment.

FIG. 5 illustrates an embodiment of an integrated sensor and lens assembly undergoing a curing process during manufacture. In the illustrated embodiment, the lens holder 110 includes one or more ports 506 that enable ultraviolet (UV) rays to pass through from the LED UV system 504. The UV rays cure the adhesive 234 and thereby to lock the lens barrel 110 and lens holder 120 in place after tested and properly aligned. A top ring UV cure 502 is also applied to the top of the lens holder 110. In one embodiment, the lens holder 120 includes four ports 506 equally spaced around the circumference of the tube portion 122 of the lens holder 110. Alternatively, three equally spaced ports 506 or a different number or configuration of ports 506 may be used.

Figure 6:
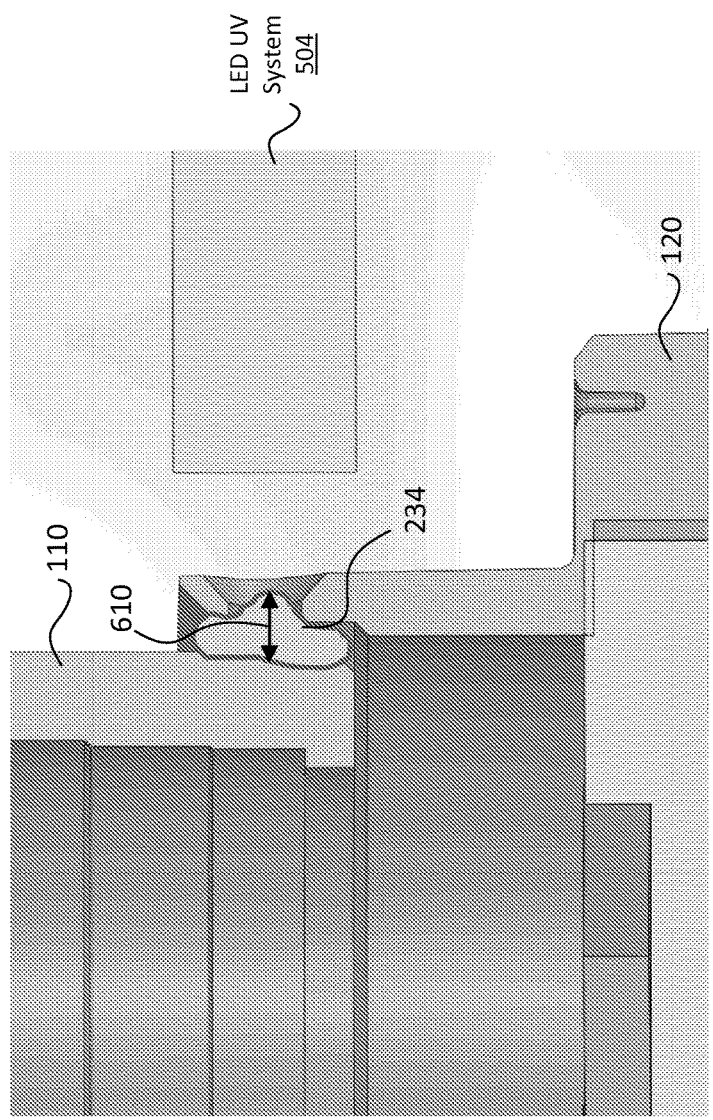
FIG. 6 is an enlarged view of the example integrated sensor and lens assembly undergoing the curing process during manufacture as illustrated in FIG. 5.

The curing process settles the lens barrel 110 in the lens holder to provide the desired modulation transfer function (MTF) and focuses position of the lenses prior to further thermal curing. As illustrated in FIG. 6, the adhesive has a curing depth such that it immobilizes the settled lens barrel 110 prior to thermal curing. Particularly, the depth of the adhesive from the external opening of the pot 506 to the interior surface of the lens barrel 110 (for example, the depth 610 in FIG. 6) locks the lens barrel 110 in place even before curing is applied.

Figure 7:
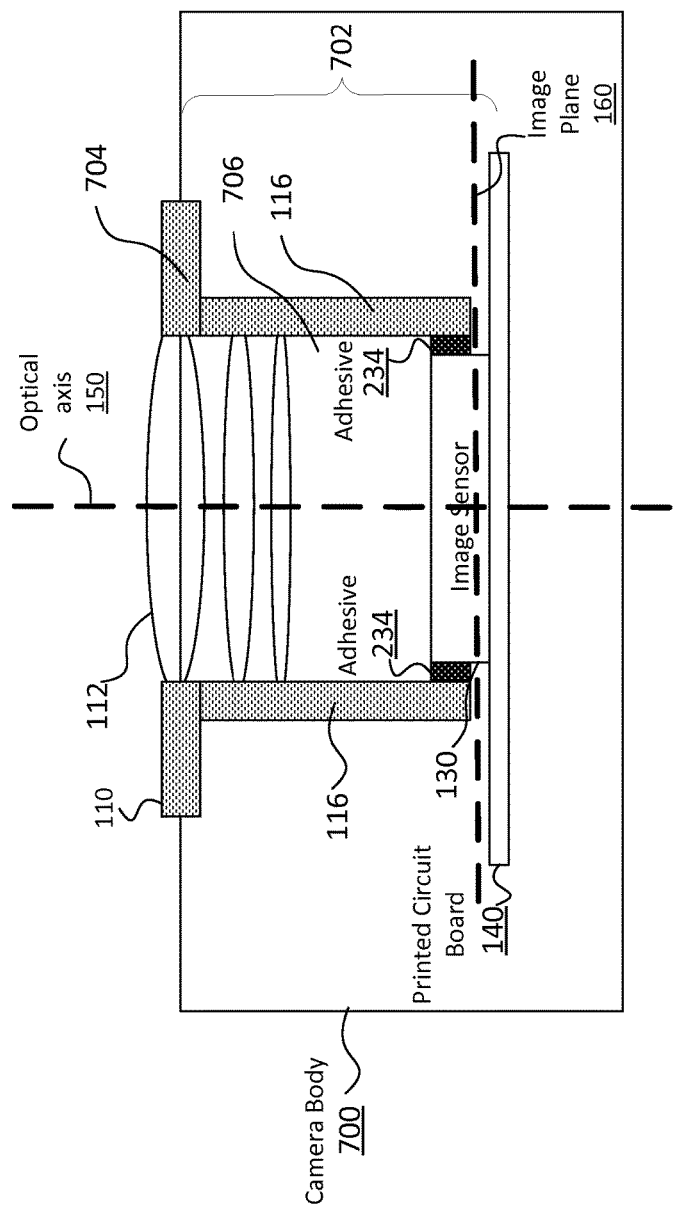
FIG. 7 illustrates an example integrated sensor and lens assembly in an example camera body, according to one embodiment.

FIG. 7 illustrates another alternative embodiment of an integrated sensor and lens assembly 702 for use in a camera body 700. The lens assembly 702 comprises a lens barrel 110, an image sensor substrate 140, and an image sensor assembly 130. Similar to the embodiment illustrated in FIG. 1, the image sensor substrate 140 comprises a printed circuit board for mounting the image sensor assembly 130 and may furthermore include various electronic components that that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to lens barrel 110. The image sensor of the image sensor assembly 130 lies on an image plane 160.

The lens barrel 110 comprises one or more lenses or other optical components to direct light to the image sensor assembly 130. The lens barrel 110 comprises a lower portion 116 and an upper portion 704 having a lens window 112. The lower portion of the lens barrel 116 includes a channel 706 for receiving the image sensor assembly 130. The channel 706 can be substantially cylindrical, square, rectangular, or other shaped. The lens barrel 110 may be physically coupled to the camera body 700. The lens window 112 includes optical components to enable external light to enter the lens barrel 110 and be directed to the image sensor assembly 130. The lens barrel 110 is positioned such that the image sensor assembly 130 protrudes into the channel 706. An interior surface of the lens barrel 110 is oriented to be substantially perpendicular to the image plane 160 and substantially parallel to the optical axis 150.

The image sensor assembly 130 is adhered to the interior surface of the lens barrel 110 directly via the adhesive 234, without a separate lens holder. The image sensor assembly 130 includes a plurality of side walls oriented in a direction substantially perpendicular to the substrate 140. The adhesive 234 is applied between the interior surface of the lens barrel 110 and an outer side wall of the image sensor 130. The integrated sensor and lens assembly 702 is substantially cylindrical, square, or rectangular.

In one embodiment, the channel 706 of the lens barrel 110 is substantially square or rectangular and the image sensor assembly 130 is substantially square or rectangular. The channel 706 of the lens barrel 110 mates with the image sensor assembly 130 such that an interior surface of the channel 706 of the lens assembly 1302 adheres to the outer side wall of the image sensor 130. In another embodiment, the channel 706 of the lens barrel 110 may be substantially circular and mate with a substantially circular image sensor 130. In yet another embodiment (not shown), an adhesive 234 is applied between a top surface of the image sensor assembly 130 and a shelf that protrudes from an interior surface of the lens barrel 112 in a direction substantially parallel to the top surface of the image sensor 130. Other embodiments and features described above (e.g., the use of gasket 232, the use of ridges 236) may be combined with the embodiment of FIG. 13 in which the lens assembly 702 includes a lens barrel adhered to the image sensor assembly 130 via the adhesive 234 directly. The gasket may be positioned at a lower end of the lens barrel 110 just below the adhesive 234.

Example Camera System Configuration

Figure 8:
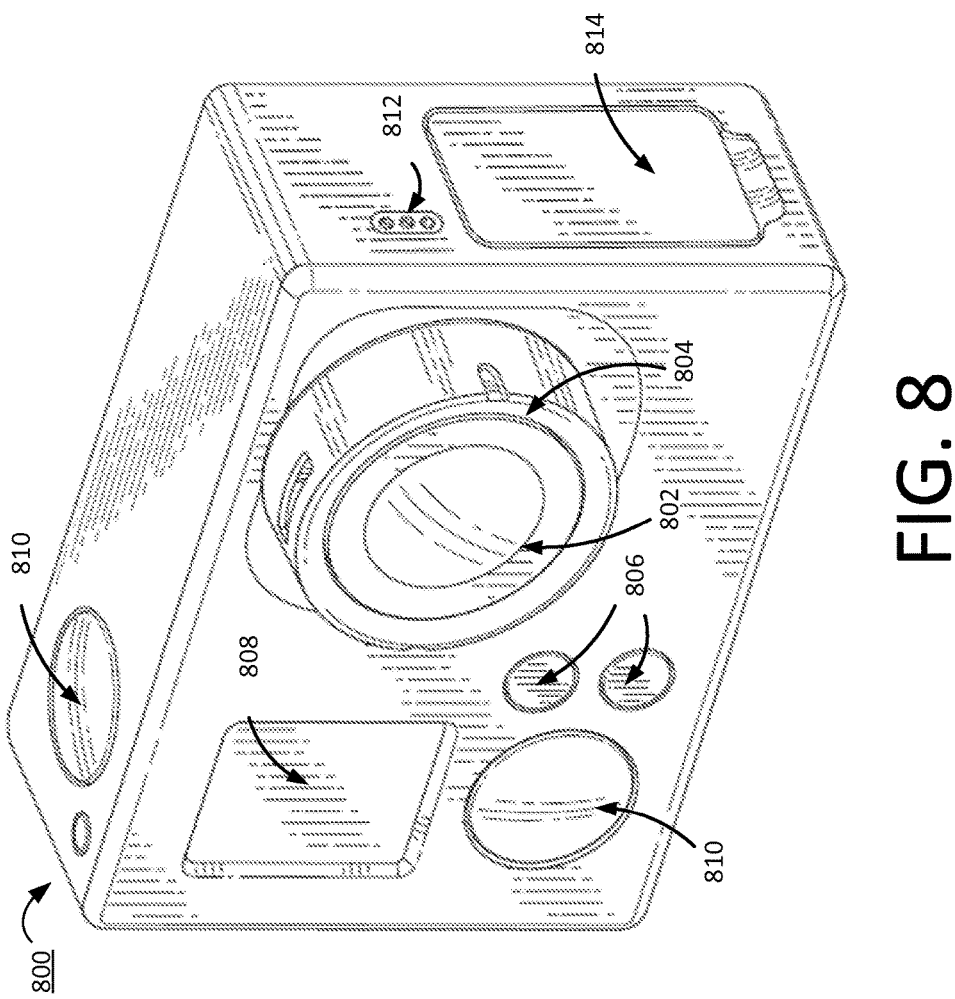
FIG. 8 illustrates an example camera that includes the example integrated image sensor and lens assembly of FIG. 1.

FIG. 8 illustrates an embodiment of an example camera 800 that includes the integrated image sensor and lens assembly 100 described above. The camera 800 comprises a camera body having a camera lens structured on a front surface of the camera body, various indicators on the front of the surface of the camera body (such as LEDs, displays, and the like), various input mechanisms (such as buttons, switches, and touch-screen mechanisms), and
electronics (e.g., imaging electronics, power electronics, etc.) internal to the camera body for capturing images via the camera lens and/or performing other functions. The camera I 800 is configured to capture images and video, and to store captured images and video for subsequent display or playback. As illustrated, the camera 800 includes a lens 802 configured to receive light incident upon the lens and to direct received light onto an image sensor internal to the lens. The lens 802 is enclosed by a lens ring 804, which are both part of the integrated image sensor and lens assembly 100 discussed above.

The camera 800 can include various indicators, including the LED lights 806 and the LED display 808. The camera 800 can also include buttons 810 configured to allow a user of the camera to interact with the camera, to turn the camera on, and to otherwise configure the operating mode of the camera. The camera 800 can also include a microphone 812 configured to receive and record audio signals in conjunction with recording video. The side of the camera 800 includes an I/O interface 814.

ADDITIONAL CONFIGURATION CONSIDERATIONS

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated image sensor and lens assembly comprising:
    an image sensor substrate;
    an image sensor assembly mounted on the image sensor substrate and housing an image sensor, the image sensor assembly having one or more side walls;
    a single-piece lens barrel directly attached to one or more lenses; and
    an adhesive formed between an interior surface of the single-piece lens barrel and the one or more side walls, the interior surface being directly adhered to the one or more side walls via the adhesive.

2. The integrated image sensor and lens assembly of claim 1, wherein the one or more side walls are oriented in a direction substantially perpendicular to the image sensor substrate.

3. The integrated image sensor and lens assembly of claim 1, wherein the one or more lenses are affixed within a channel along the interior surface of the single-piece lens barrel, wherein the single-piece lens barrel is positioned such that the image sensor assembly protrudes into the channel.

4. The integrated image sensor and lens assembly of claim 3, further comprising:

a gasket forming a seal between the interior surface and the one or more side walls.

5. The integrated image sensor and lens assembly of claim 4, wherein the gasket is positioned between the adhesive and the image sensor substrate.

6. The integrated image sensor and lens assembly of claim 4, wherein the gasket comprises a pliable material.

7. The integrated image sensor and lens assembly of claim 6, wherein the pliable material includes at least one of a rubber or a plastic.

8. The integrated image sensor and lens assembly of claim 1, wherein the interior surface includes a plurality of ridges and the adhesive is formed along the plurality of ridges.

9. The integrated image sensor and lens assembly of claim 1, wherein the one or more side walls include a plurality of ridges and the adhesive is formed along the plurality of ridges.

10. The integrated image sensor and lens assembly of claim 1, wherein the interior surface comprises a substantially smooth surface.

11. The integrated image sensor and lens assembly of claim 3, wherein the channel and the image sensor assembly are at least one of substantially cylindrical, square, or rectangular such that the channel mates with the image sensor assembly.

12. The integrated image sensor and lens assembly of claim 1, further comprising:
a shelf protruding from the interior surface.

13. The integrated image sensor and lens assembly of claim 12, wherein the shelf protrudes in a direction substantially parallel to a top surface of the image sensor assembly.

14. The integrated image sensor and lens assembly of claim 13, wherein the adhesive is formed between the shelf and the top surface.

15. An imaging device, comprising:
a body;
electronics internal to the body to power the imaging device and to process images captured by the imaging device; and
an integrated image sensor and lens assembly comprising:
an image sensor substrate;
an image sensor assembly mounted on the image sensor substrate and housing an image sensor, the image sensor assembly having one or more side walls;
a single-piece lens barrel directly attached to one or more lenses; and
an adhesive formed between an interior surface of the single-piece lens barrel and the one or more side walls, the interior surface being directly adhered to the one or more side walls via the adhesive.

16. The imaging device of claim 15, further comprising:
a gasket forming a seal between the interior surface of the single-piece lens barrel and the one or more side walls.

17. The imaging device of claim 16, wherein the gasket comprises a pliable material.

18. The imaging device of claim 15, wherein the interior surface includes a plurality of ridges and the adhesive is formed along the plurality of ridges.

19. The imaging device of claim 15, further comprising:
a shelf, wherein the adhesive is formed between the shelf and the image sensor assembly.

20. The imaging device of claim 15, wherein the one or more lenses are affixed within a channel along the interior surface of the single-piece lens barrel, wherein the single-piece lens barrel is positioned such that the image sensor assembly protrudes into the channel.

* * * * *